United States Patent
Takayama et al.

(10) Patent No.: US 11,733,682 B2
(45) Date of Patent: Aug. 22, 2023

(54) MANAGEMENT DEVICE AND ARTICLE MANAGEMENT SYSTEM

(71) Applicant: Ishida Co., Ltd., Kyoto (JP)

(72) Inventors: Motoki Takayama, Ritto (JP); Naoki Furuya, Ritto (JP); Yuki Horii, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 17/573,439

(22) Filed: Jan. 11, 2022

(65) Prior Publication Data

US 2022/0221840 A1     Jul. 14, 2022

(30) Foreign Application Priority Data

Jan. 13, 2021   (JP) ................................. 2021-003410

(51) Int. Cl.
*G05B 19/4155*     (2006.01)

(52) U.S. Cl.
CPC ............ *G05B 19/4155* (2013.01); *G05B 2219/31372* (2013.01)

(58) Field of Classification Search
None
See application file for complete search history.

(56) References Cited

U.S. PATENT DOCUMENTS

| 2005/0145259 | A1  | 7/2005 | Focke et al. |
| 2015/0176931 | A1* | 6/2015 | Aeberhard ............... F28F 27/00 165/200 |
| 2016/0229574 | A1  | 8/2016 | Tanaka et al. |

FOREIGN PATENT DOCUMENTS

| EP | 0 614 814 A1   | 9/1994 |
| JP | H9-301327 A    | 11/1997 |
| JP | 2001-101303 A  | 4/2001 |
| JP | 2016-145062 A  | 8/2016 |
| JP | 2020-045175 A  | 3/2020 |

OTHER PUBLICATIONS

The extended European search report issued by the European Patent Office dated Jun. 21, 2022, which corresponds to European Patent Application No. 22150611.6-1205 and is related to U.S. Appl. No. 17/573,439.

* cited by examiner

*Primary Examiner* — Ryan A Jarrett
(74) *Attorney, Agent, or Firm* — Studebaker & Brackett PC

(57) ABSTRACT

A management device includes: a storage unit; a first receiving unit; a communication unit; and a management control unit configured to perform setting control for transmitting a control parameter and device identification information corresponding to the reservation number to each article processing device, which is identified based on the device identification information via the communication unit, when a reservation number is received by the first receiving unit, and to perform storage control for storing adjustment information of a changed control parameter in the storage unit in association with the device identification information and the reservation number when the control parameter transmitted to each of the article processing devices is changed in each of the article processing devices.

17 Claims, 7 Drawing Sheets

MANAGEMENT DEVICE AND ARTICLE MANAGEMENT SYSTEM

TECHNICAL FIELD

An aspect of the present disclosure relates to a management device and an article management system.

BACKGROUND

For example, Patent Literature 1 (Japanese Unexamined Patent Publication No. 2001-101303) discloses a production line including a plurality of article processing devices, such as a transport device for transporting articles such as raw materials or semi-finished products, a weighing device for weighing the articles supplied by the transport device, a packaging device for packaging the weighed articles, a weight inspection device for checking the weight of each packaged article and removing non-standard articles in which abnormalities are detected, and a boxing device for packing a plurality of packaged articles (products) that have passed the weight inspection device in a case. In each of such article processing devices, various control parameters for optimally operating the article processing device in processing articles or products are set.

For example, Patent Literature 2 (Japanese Unexamined Patent Publication No. 2016-145062) discloses a management system (packaging system) that, when setting control parameters in an article processing device (packaging device), connects each article processing device and a server to each other so as to be able to communicate with each other and transmits control parameters considered to be optimal to each article processing device. According to this management system, it is possible to significantly reduce the operation of setting the control parameters in each article processing device.

Incidentally, since there are machine differences in the article processing devices, optimum control parameters differ in practice according to each device even if the article processing devices are of the same type. For this reason, even when control parameters considered to be optimal are transmitted from the server (management device), the operator may change the control parameters depending on the article processing device. In such a situation, when appropriately managing the control parameters changed in each article processing device and resetting the control parameters (for example, changing articles (products) to be produced), there is a desire to reflect the changed control parameters.

SUMMARY

Therefore, it is an object of the disclosure to provide a management device and an article management system capable of appropriately managing control parameters changed in each article processing device and reflecting the changed control parameters when resetting control parameters.

A management device according to an aspect of the disclosure is a management device configured to manage a same type of article processing devices provided in each of different production lines, and includes: a storage unit configured to store associated device identification information for uniquely identifying each of the article processing devices, a reservation number for uniquely identifying different types of products, a control parameter regarding operation of each of the article processing devices, and adjustment information regarding a change when the control parameter is changed in each of the article processing devices; a first receiving unit configured to receive an input of the reservation number; a communication unit configured to communicate with each of the article processing devices; and a management control unit configured to acquire the control parameter and the device identification information corresponding to the reservation number from the storage unit, when the first receiving unit receives the reservation number, and performs setting control for transmitting the acquired control parameter to each of the article processing devices identified based on the device identification information via the communication unit and storage control for storing the adjustment information of the changed control parameter in the storage unit in association with the device identification information and the reservation number when the control parameter transmitted to each of the article processing devices is changed in each of the article processing devices.

The management device having this configuration can transmit the control parameter stored in the storage unit to each article processing device and set the control parameter in each article processing device by the above-described setting control. Therefore, the operator can make an adjustment in consideration of the machine difference based on the transmitted control parameter, thereby making it possible to reduce the adjustment burden of the operator. In addition, the control parameter adjusted by the operator in each article processing device is collected by the above-described storage control. Therefore, even if the same type of article processing devices are set with different control parameters depending on the production line 10, it is possible to appropriately manage the control parameters changed in each article processing device and to reflect the individually changed control parameters when resetting the control parameters.

In the management device according to the aspect of the disclosure, the storage control may determine whether or not to store the adjustment information of the changed control parameter in the storage unit in association with the device identification information and the reservation number based on the adjustment information of the changed control parameter as well as authentication information transmitted from each of the article processing devices where the control parameter is changed. In this configuration, only the adjustment information of the control parameter changed by the authorized operator is stored in the storage unit, thereby making it possible to prevent the control parameter from being updated in a disorderly manner.

In the management device according to the aspect of the disclosure, the storage control may cause the first receiving unit to receive a selection of whether or not to store the adjustment information of the changed control parameter in the storage unit in association with the device identification information and the reservation number. In this configuration, the determination as to whether or not to store the control parameter changed by the operator is made by the operator who inputs the information to the first receiving unit, thereby making it possible to prevent the control parameter from being changed in a disorderly manner.

In the management device according to the aspect of the disclosure, the storage control may determine whether or not to store the adjustment information of the changed control parameter in the storage unit in association with the device identification information and the reservation number based on whether or not the adjustment information of the changed control parameter meets predetermined conditions. In this configuration, the adjustment information that has been adjusted to the extreme degree is automatically excluded, thereby making it possible to prevent the control parameter from being changed in a disorderly manner.

In the management device according to the aspect of the disclosure, the storage control may determine whether or not the adjustment information of the changed control parameter meets predetermined conditions, and may store the adjustment information of the changed control parameter that meets the predetermined conditions or the adjustment information of the changed control parameter that does not meet the predetermined conditions in the storage unit so as to be identifiable. In this configuration, the storage of the adjustment information that has been adjusted to the extreme degree can be easily specified. Therefore, for example, if there is a problem in the stored adjustment information, it is possible to quickly respond to the problem.

In the management device according to the aspect of the disclosure, the setting control may transmit the adjustment information to another of the same type of article processing devices in which the device identification information differs. In this configuration, it is possible to set the optimum control parameter by using the adjustment information of the article processing device having a similar configuration even though the machine difference is not taken into consideration. This makes the adjustment easier than in the case of adjusting the control parameter from 1 to the optimum value.

In the management device according to the aspect of the disclosure, the setting control may transmit the control parameter to another of the same type of article processing devices in which the device identification information differs. In this configuration, it is possible to appropriately set the control parameter by using the control parameter of the article processing device having a similar configuration even though the machine difference is not taken into consideration. This makes the adjustment easier than in the case of adjusting the control parameter from 1 to an appropriate value.

In the management device according to the aspect of the disclosure, the storage unit may store processing information regarding at least one of characteristics of the product or articles forming the product and processing of the product or the articles in association with the reservation number. When the control parameter corresponding to the reservation number is not stored in the storage unit, the control unit may generate the control parameter as a default value based on the processing information. In this configuration, it is possible to appropriately set the control parameter by using the theoretically reasonable control parameter even though the machine difference is not taken into consideration. This makes the adjustment easier than in the case of adjusting the control parameter from 1 to an appropriate value.

The management device according to the aspect of the disclosure may further include an operation control unit that reads at least one of the control parameter and the adjustment information corresponding to the reservation number from the storage unit, when the first receiving unit receives the reservation number, transmits the at least one of the control parameter and the adjustment information to each of the article processing devices based on the device identification information, and operates each of the article processing devices based on the at least one of the control parameter and the adjustment information. In this configuration, the article processing device can always be operated based on the information stored in the storage unit.

An article management system according to another aspect of the disclosure includes: the management device described above; the article processing devices provided so as to be communicable with the management device via the communication unit; and a control device having a second receiving unit for receiving the reservation number and an operation control unit that reads at least one of the control parameter and the adjustment information corresponding to the reservation number from the storage unit, when the second receiving unit receives the reservation number, transmits the at least one of the control parameter and the adjustment information to each of the article processing devices based on the device identification information, and operates each of the article processing devices based on the at least one of the control parameter and the adjustment information. In this configuration, the article processing device can always be operated based on the information stored in the storage unit.

An article management system according to still another aspect of the disclosure includes: the management device described above; and the article processing devices provided so as to be communicable with the management device via the communication unit. The article management system having this configuration can transmit the control parameter stored in the storage unit to each article processing device and set the control parameter of each article processing device by the setting control described above. Therefore, the operator can make an adjustment in consideration of the machine difference based on the transmitted control parameter, thereby making it possible to reduce the adjustment burden of the operator. In addition, the control parameter adjusted by the operator is collected by the above-described storage control, thereby making it possible to appropriately manage the control parameter changed in each article processing device and to reflect the changed control parameter when resetting the control parameter.

In the article management system according to the aspect of the disclosure, each of the article processing devices may have a third receiving unit for receiving authentication information, and may determine whether or not to transmit the adjustment information of the changed control parameter to the management device based on the authentication information received by the third receiving unit. In this configuration, only the adjustment information of the control parameter changed by the authorized operator is stored in the storage unit, thereby making it possible to prevent the adjustment information of the control parameter from being updated in a disorderly manner.

According to an aspect of the disclosure, it is possible to appropriately manage the control parameter changed in each article processing device and to reflect the changed control parameter when resetting the control parameter.

DETAILED DESCRIPTION

Figure 1:
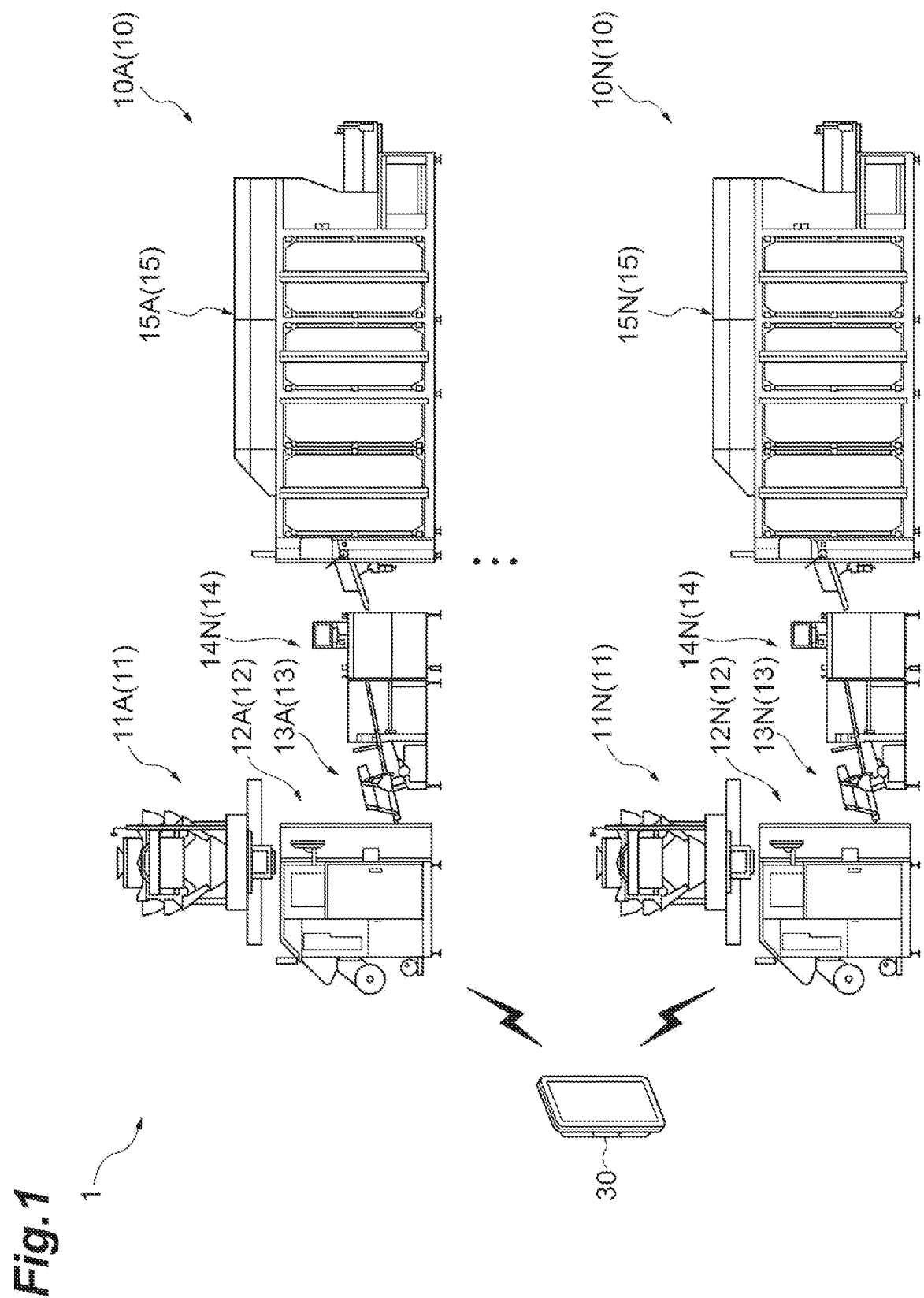
FIG. 1 is a diagram showing the configuration of a production line system according to an embodiment.

Hereinafter, preferred embodiments of the present disclosure will be described in detail with reference to the accompanying diagrams. In the description of the diagrams, the same or equivalent elements are denoted by the same reference numerals, and repeated description thereof will be omitted.

As shown in FIG. 1, a production line system (article management system) 1 of the present embodiment includes production lines 10A to 10N (hereinafter, also referred to as a "production line 10") each including a plurality of article processing devices and a terminal device (management device) 30 for unifying the production management of the production line 10. The production line 10 manufactures products from articles, such as materials or processed products, and performs various inspections on the manufactured products. The article processing device is a device that performs some processes on the articles or products.

Each production line 10 is a group of article processing devices for performing everything from weighing articles to inspecting products and boxing, and includes: a combination weighing device 11 (11A to 11N) for weighing articles into predetermined weights; a bag-making and packaging device 12 (12A to 12N) for packaging the articles weighed by the combination weighing device 11 while making a bag for packaging the articles; a seal inspection device 13 (13A to 13N) for detecting an abnormality in a bag from the bag-making and packaging device 12; a weight inspection device 14 (14A to 14N) for inspecting the weight of the product containing the articles; and a boxing device 15 (15A to 15N) for packing the product in a cardboard box.

Figure 2:
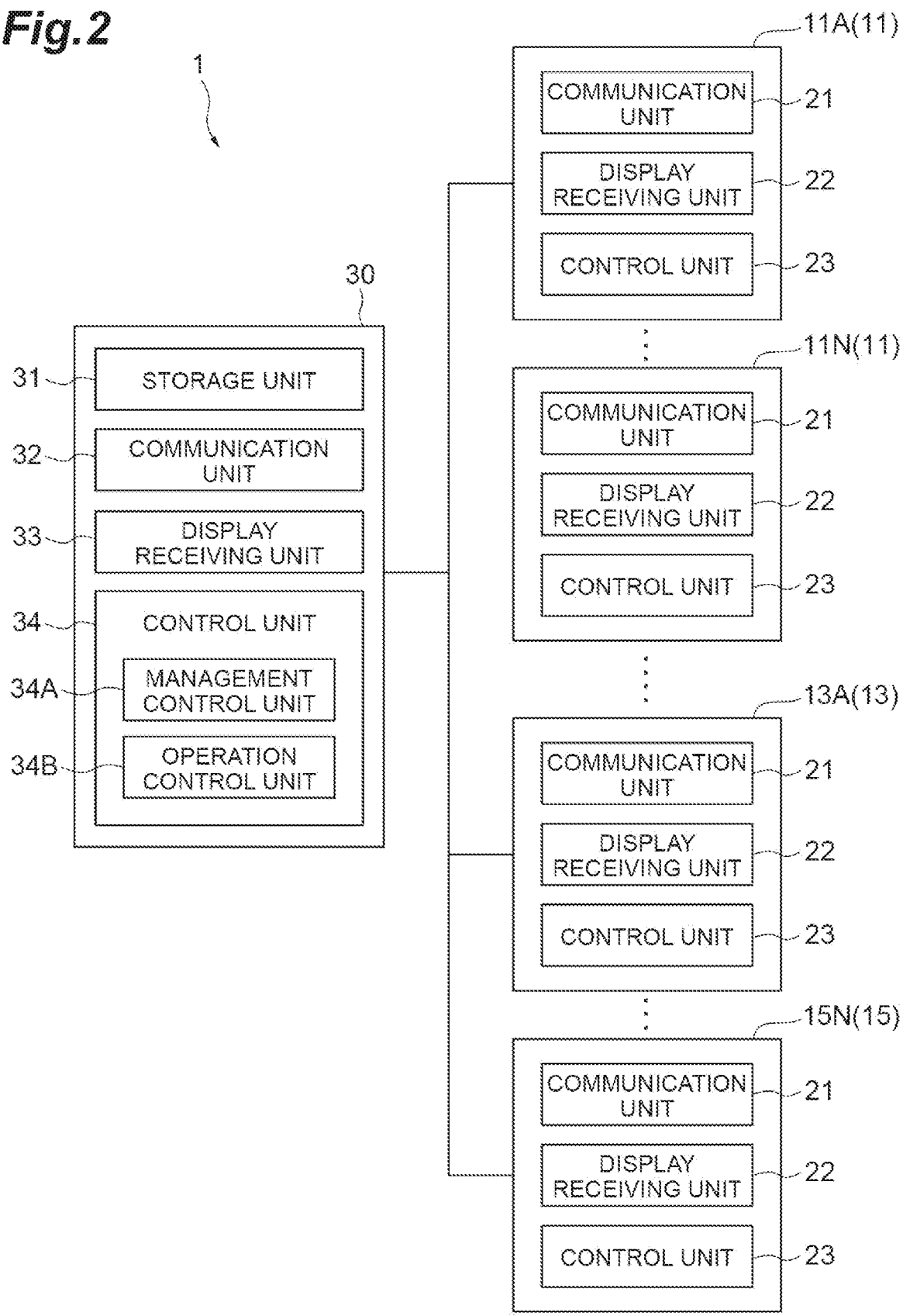
FIG. 2 is a block diagram showing the functional configuration of the production line system.

As shown in FIG. 2, each of the article processing devices configuring the production line 10 includes at least a communication unit 21, a display receiving unit (third receiving unit) 22, and a control unit 23.

The communication unit 21 communicates with the terminal device 30. The communication unit 21 and the terminal device 30 are provided so as to be able to directly or indirectly communicate with each other by wire or wirelessly. The display receiving unit 22 functions as an input unit and an output unit in each article processing device. The display receiving unit 22 displays various kinds of information and receives an operation of the operator. The display receiving unit 22 may be configured such that a physical operation button and a display panel, such as a liquid crystal display, are separately provided, or may be configured as a touch panel. The display receiving unit 22 of the present embodiment displays a list screen of control parameters, a change screen of control parameters, and the like in each article processing device, and receives a setting or change of a control parameter in the article processing device from the operator.

The control parameters are setting information that defines various operations in the article processing device for each product (reservation number) to be manufactured. Examples of the control parameters of the combination weighing device 11 include target mass value, mass upper limit value, feeder strength, feeder time, and capacity. Examples of the control parameters of the bag-making and packaging device 12 include bag length, bag width, register mark position, tracking position, and capacity. Examples of the control parameters of the seal inspection device 13 include bag length, minimum thickness, maximum thickness, air leakage determination value, and pressure level.

Examples of the control parameters of the weight inspection device 14 include bag length, reference mass value, mass lower limit value, mass upper limit value, and empty bag mass. Examples of the control parameters of the boxing device 15 include box length, box width, box height, the number of rows, and the number of bags in each row.

The control unit 23 includes an input and output interface for receiving and outputting a signal from and to the outside, a storage medium such as a ROM (Read Only Memory) that stores programs, information, and the like for performing processing and a RAM (Random Access Memory) that temporarily stores data, a CPU (Central Processing Unit), and a communication circuit. The control unit 23 stores the input data in the RAM based on the signal output from the CPU, loads the program stored in the ROM to the RAM, and executes the program loaded to the RAM to perform various processes in each article processing device.

Figure 3:
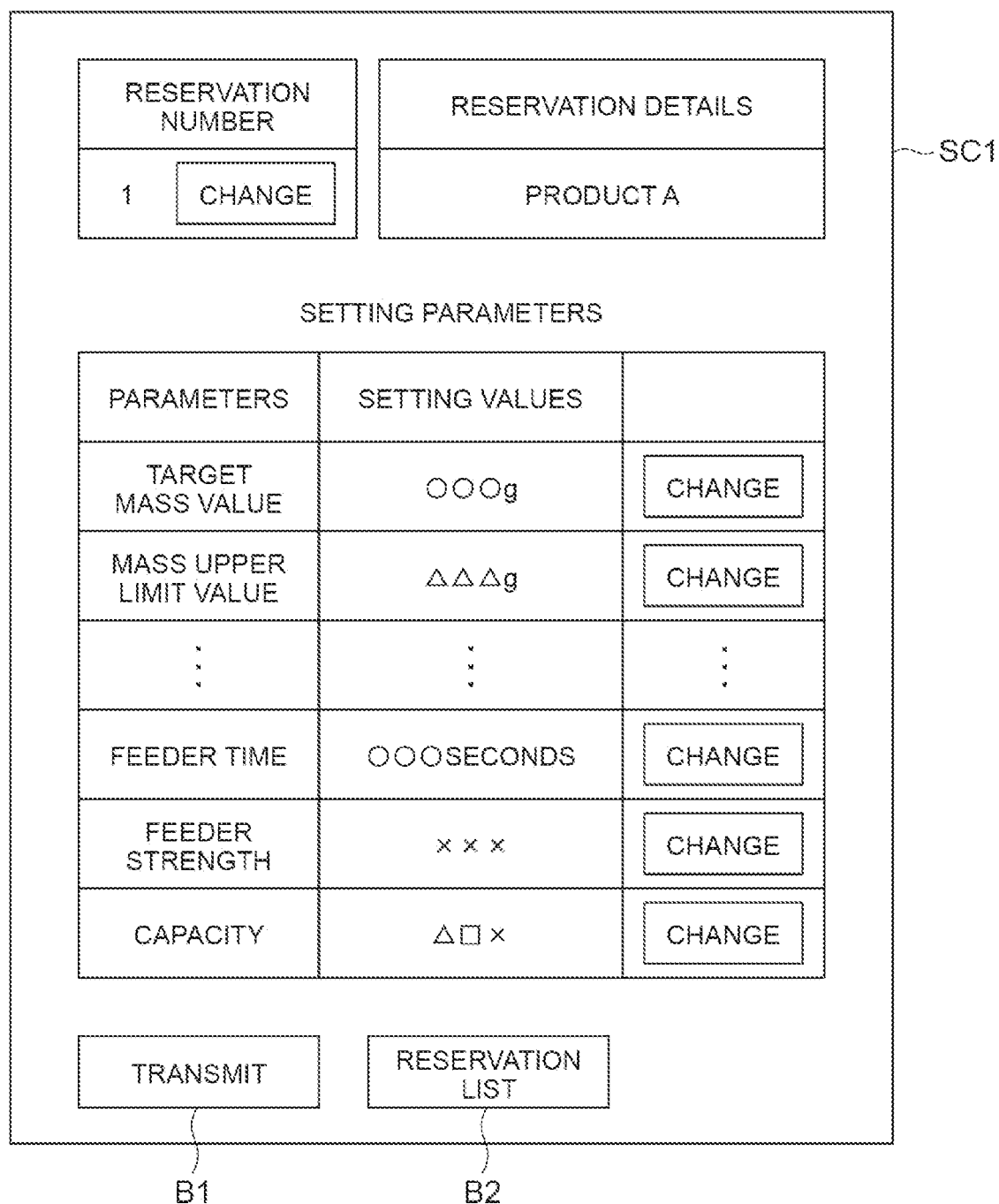
FIG. 3 is an example of a setting screen displayed on a display receiving unit of an article processing device.

As shown in FIG. 3, the control unit 23 displays the control parameters transmitted from the terminal device 30 on the display receiving unit 22 as a setting screen SC1, receives control parameter changes (settings) from the operator through the setting screen SC1, transmits adjustment information, which is information regarding changes in the control parameters changed by the operator, to the terminal device 30 through the communication unit 21, or operates the article processing device based on the adjustment information transmitted from the terminal device 30.

The adjustment information referred to herein is information regarding changes in control parameters set in advance in each article processing device (including a case where there is no initial setting value and setting value (NULL)). Examples of the adjustment information include not only a difference and/or a change rate with respect to the original control parameter but also the adjusted control parameter itself adjusted corresponding to the adjustment information. In the following description, an example will be described in which the control unit 23 of the article processing device transmits the "adjusted control parameter adjusted corresponding to the adjustment information". However, the same applies to an example of transmitting the "difference and/or change rate with respect to the original control parameter". Hereinafter, the "adjusted control parameter adjusted corresponding to the adjustment information" is simply referred to as "adjusted control parameter".

In addition, the control unit 23 identifies a person who operates the display receiving unit 22 of the article processing device, and determines what kind of authority the identified user has (performs user authentication processing). Specifically, the control unit 23 requests the operator to input a user name before inputting information or receiving an operation in the display receiving unit 22, and determines the user authority (administrative user or general user) based on the input user name and the user information stored in advance. In addition, login authentication that requires a password at the same time as inputting the user name may be added.

The control unit 23 determines whether or not to transmit the control parameter changed in the article processing device, that is, the adjusted control parameter to the terminal device 30, based on information indicating which operator has changed the control parameter. Specifically, the control unit 23 transmits the adjusted control parameter to the terminal device 30 if the change has been made by the operator authenticated as an administrative user in the previous authentication process, and does not transmit the adjusted control parameter to the terminal device 30 in the case of a general user.

The terminal device 30 controls an article processing device provided in each of the production lines 10A to 10N. In addition, the terminal device 30 of the present embodiment manages the same type of article processing devices provided in the different production lines 10A to 10N. The article processing devices of the same type refer to the relationship between the combination weighing devices 11A to 11N, the relationship between the bag-making and packaging devices 12A to 12N, the relationship between the seal inspection devices 13A to 13N, the relationship between the weight inspection devices 14A to 14N, and the relationship between the boxing devices 15A to 15N. The terminal device 30 of the present embodiment centrally manages the control parameters set in the same type of article processing devices. More specifically, the terminal device 30 sets the same control parameters for the same type of another article processing device, or acquires and manages the adjusted control parameters set in each article processing device, or transmits (sets) the control parameters set in one article processing device or the adjusted control parameters to another article processing device.

The terminal device 30 may be arranged in a monitoring room or the like of a factory or the like where the production line 10 is provided. For example, the terminal device 30 may be arranged in any one of the article processing devices configuring the production line 10 (for example, the bag-making and packaging device 12A of the production line 10A), or may be configured to be portable like a tablet. The terminal device 30 has a storage unit 31, a communication unit 32, a display receiving unit (first receiving unit) 33, and a control unit (management control unit) 34.

The storage unit 31 can be configured by, for example, an SSD (Solid State Drive) or an HDD (Hard Disk Drive). The storage unit 31 stores device identification information that uniquely identifies each article processing device, a reservation number that uniquely identifies different types of articles, control parameters that are information regarding the operation of each article processing device, and adjustment information that is information regarding changes when control parameters are changed in each article processing device, in association with each other. In the present embodiment, the adjusted control parameters are stored in the adjustment information.

Figure 4:
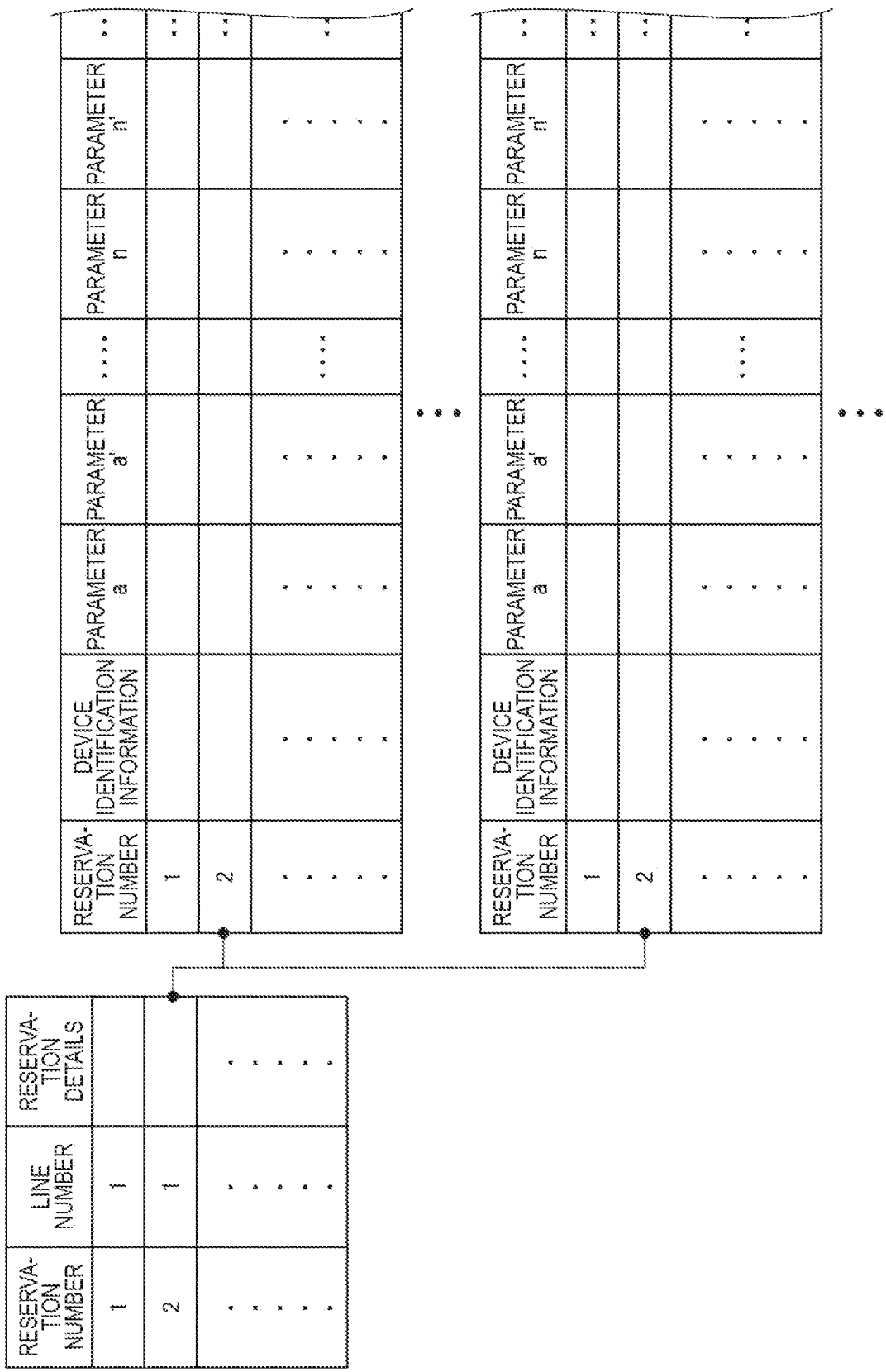
FIG. 4 is a diagram showing the structure of reservation data stored in a storage unit.

As shown in FIG. 4, the storage unit 31 of the present embodiment stores reservation numbers, reservation details, device identification information, control parameters (parameter a, . . . , parameter n), and adjusted control parameters (parameter a', . . . , parameter n') in association with each other. That is, the storage unit 31 stores the control parameters of each article processing device in association with each product for each production line. A group of data associated with the reservation numbers is referred to as reservation data. In the production line system 1 of the present embodiment, a product is manufactured using the reservation data.

The communication unit 32 communicates with each article processing device provided in each of the production lines 10A to 10N. The communication unit 32 and each article processing device are provided so as to be able to directly or indirectly communicate with each other by wire or wirelessly.

Figure 5:
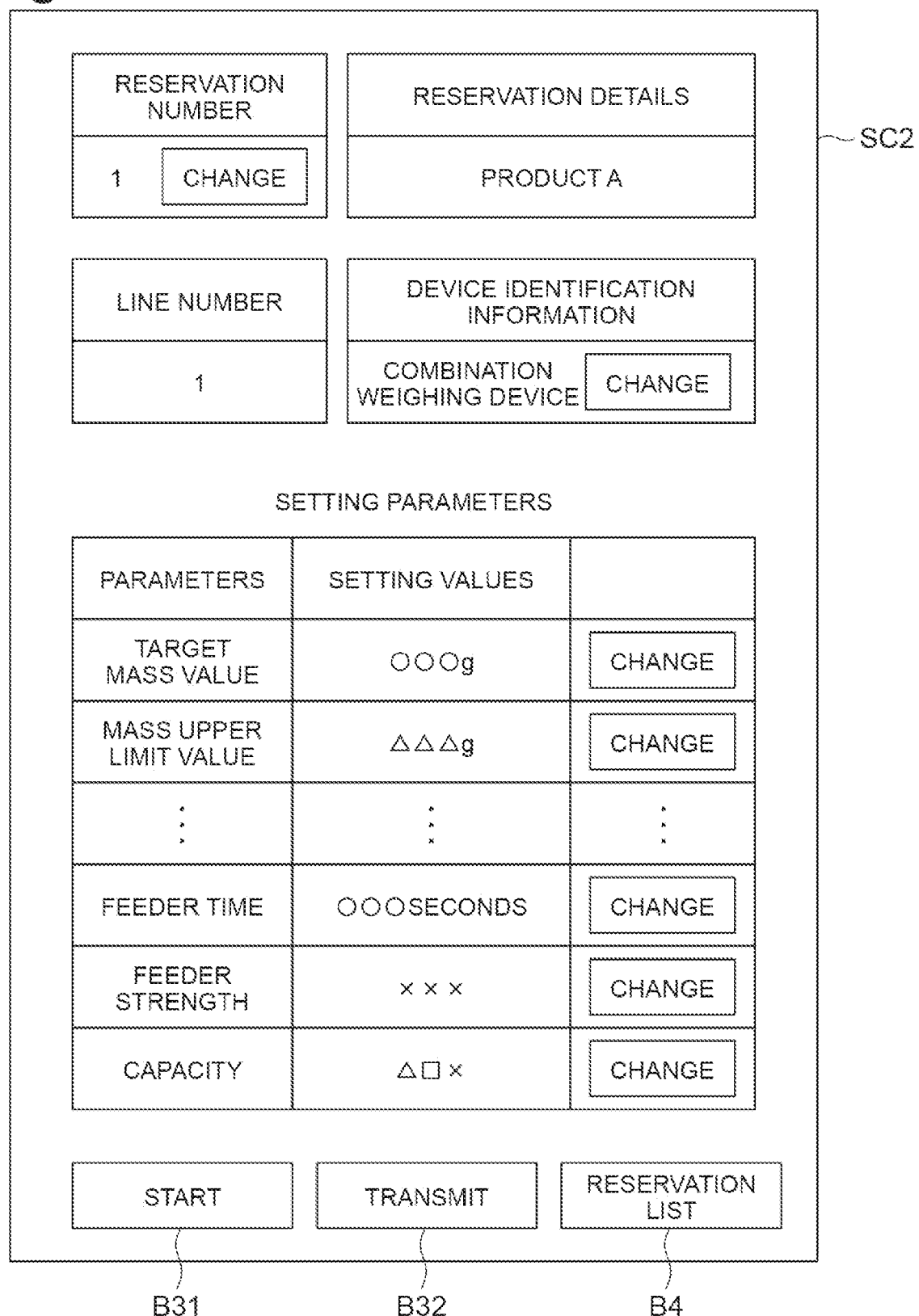
FIG. 5 is an example of a management screen displayed on a display receiving unit of a management device.

The display receiving unit 33 displays various kinds of information and receives an operation of the operator. The display receiving unit 33 may be configured such that a physical operation button and a display panel, such as a liquid crystal display, are separately provided, or may be configured as a touch panel. As shown in FIG. 5, the display receiving unit 33 of the present embodiment displays a management screen SC2 that can display a list of reservation numbers, reservation details, line numbers, device identification information, and control parameters from the operator or can receive changes in the setting values of reservation numbers, line numbers, device identification information, and control parameters from the operator. In addition, in the management screen SC2 of FIG. 5, an example is shown in which the control parameters of a desired article processing device can be displayed among a plurality of article processing devices configuring the production line by selecting the device identification information. However, the control parameters of a desired article processing device may be displayed by scrolling the screen, for example.

Referring back to FIG. 2, the control unit 34 includes an input and output interface for receiving and outputting a signal from and to the outside, a storage medium such as a ROM (Read Only Memory) that stores programs, information, and the like for performing processing and a RAM (Random Access Memory) that temporarily stores data, a CPU (Central Processing Unit), and a communication circuit. The control unit 34 stores the input data in the RAM based on the signal output from the CPU, loads the program stored in the ROM to the RAM, and executes the program loaded to the RAM to execute various processes. In the control unit 34, a management control unit 34A and an operation control unit 34B shown below are formed by the cooperation of hardware, such as a CPU, a RAM, and a ROM, and software, such as a program. Various processes in the management control unit 34A and the operation control unit 34B are executed under the control of the CPU.

The management control unit 34A performs setting control to facilitate the setting of control parameters in the article processing device configuring the production line 10. When the display receiving unit 33 receives the reservation number from the operator, the management control unit 34A acquires a control parameter (reservation data) corresponding to the reservation number from the storage unit 31 and transmits the acquired control parameter (reservation data) to each article processing device through the communication unit 32 based on the device identification information (setting control). More specifically, the control unit 34 acquires reservation data configured to include the initially set control parameters (including control parameters input to the display receiving unit 33 of the terminal device 30) from the storage unit 31, and transmits control parameters initially set in each piece of device identification information stored as reservation data.

In addition, when the control parameter transmitted to the article processing device is changed in the article processing device, the management control unit 34A acquires information regarding the changed control parameter, that is, the adjusted control parameter from the article processing device, and stores the acquired adjusted control parameter in the storage unit 31 in association with the device identification information and the reservation number (storage control). The management control unit 34A may acquire the adjusted control parameters unilaterally transmitted from the article processing device, or may acquire the adjusted control parameters transmitted by the request from the management control unit 34A to the article processing device.

As described above, the adjusted control parameters transmitted from the article processing device are control parameters changed by the operator who is the administrative user. That is, the management control unit 34A of the present embodiment stores the adjusted control parameters input by the administrative user in the storage unit 31 in association with the device identification information and the reservation number. In other words, the adjusted control parameters input by a general user who is not the administrative user are not transmitted.

In addition, the management control unit 34A of the present embodiment determines whether or not to store the transmitted adjusted control parameters in the storage unit 31 in association with the device identification information and the reservation number based on whether or not the transmitted adjusted control parameters meet predetermined conditions. For example, when the setting value relevant to the feeder time is transmitted from the combination weighing device 11B, the setting value of the feeder time is stored in the storage unit 31 if the setting value of the feeder time is within a predetermined range (for example, the amount of change or the rate of change is smaller than a threshold value set in advance, and the setting value of the feeder time is not stored in the storage unit 31 if the setting value of the feeder time is out of the predetermined range (for example, the amount of change or the rate of change is larger than the threshold value set in advance). In this configuration, since the adjusted control parameters that have been adjusted to the extreme degree are automatically excluded, it is possible to prevent the control parameters from being stored in a disorderly manner.

The management control unit 34A may store only the setting values within the predetermined range, among the transmitted adjusted control parameters, in the storage unit 31 in association with the device identification information and the reservation number. In addition, the management control unit 34A may store all of the transmitted adjusted control parameters in the storage unit 31 in association with the device identification information and the reservation number and store all of the transmitted adjusted control parameters in the storage unit 31 in a state in which it is possible to identify whether or not each transmitted adjusted control parameter is an adjusted control parameter that meets the predetermined conditions. In this case, for example, the management control unit 34A may store an adjusted control parameter that does not meet the predetermined conditions (for example, the amount of change or the rate of change is larger than the threshold value set in advance) in the storage unit 31 after adding a flag thereto. In this configuration, the adjusted control parameters that have been adjusted to the extreme degree can be easily identified. Therefore, for example, if there is a problem in the stored adjusted control parameters, it is possible to quickly identify the adjusted control parameters that have been adjusted to the extreme degree (large changes in value).

In addition, the management control unit 34A transmits the control parameters to the same type of another article processing device having different device identification information. In other words, the management control unit 34A duplicates the control parameters set in one article processing device of one production line 10, and transmits the duplicated control parameters to the article processing device of the same type as the above-described one article processing device in another production line 10. With this function, the control parameters for one production line 10 can be diverted to another production line 10. In addition, the management control unit 34A transmits the adjustment information to the same type of another article processing device having different device identification information. In other words, the management control unit 34A duplicates the adjustment information set in one article processing device of one production line 10, and transmits the duplicated adjustment information to the article processing device of the same type as the above-described one article processing device in another production line 10. By this processing, the adjustment information for one production line 10 can be diverted to another production line 10.

In addition, the control parameters or the adjustment information duplicated by the management control unit 34A may be a control parameter group (a collection of control parameters of the reference production line) of each article processing device included in one production line 10. In this case, for example, by transmitting the control parameter group to another production line 10 configured by devices that are completely the same as those in one production line 10 (or devices some of which are the same as those in one production line 10), the initial setting of the control parameters of the corresponding article processing device is completed. If necessary, it is possible to start the machine difference adjustment, and the management control unit 34A acquires the changed control parameter, the difference, or the change ratio as the adjustment information of the new production line 10.

The operation control unit 34B performs operation control to facilitate the operation of each article processing device configuring the production line 10. When the display receiving unit (second receiving unit) 33 receives a reservation number corresponding to a product that the operator desires to manufacture, the operation control unit 34B reads, from the storage unit 31, reservation data configured to include control parameters or adjusted control parameters corresponding to the reservation number, transmits the read reservation data to each article processing device based on the device identification information, and performs operation control to operate each article processing device based on the transmitted reservation data.

When the reservation number is received from the operator at the start of manufacturing the product, the operation control unit 34B of the present embodiment reads reservation data corresponding to the reservation number from the storage unit 31 and transmits the read reservation data to each article processing device based on the device identification information. Since the transmission is performed each time the product starts to be manufactured, the article processing device to which the read reservation data is transmitted performs overwriting (updating) with new control parameters each time the product starts to be manufactured. The article processing device operates based on the new control parameters. That is, the operation control unit 34B operates each article processing device based on the reservation data transmitted at the start of manufacturing the product.

Next, a method of setting various control parameters in each article processing device when the production line 10 is newly installed or added by using the terminal device 30 and manufacturing a product based on the set control parameters will be described.

(1) A Case where Initial Setting Values or Control Parameters Input by the Operator are Used The initial setting values stored in advance in the storage unit 31 or the initial setting values stored in the storage unit 31 by downloading from a predetermined server or the like are displayed on the management screen SC2 of the display receiving unit 33 as shown in FIG. 5. The above initial setting values are a data group set for each reservation number (product) and for each piece of device identification information (article processing device), and has the same configuration as the above reservation data with which the production line 10 can operate. The operator presses (touches, clicks, or the like) a transmit button B32 on the management screen SC2 to transmit the initial setting values to the target (each article processing device configuring the production line 10 for which the operator desires to set the control parameters).

Then, the operator manufactures a product on the production line 10 to which the initial setting values have been transmitted (test manufacturing). Based on the test manufacturing, the operator adjusts various control parameters in each article processing device so as to achieve the optimum manufacturing state. In addition, for the control parameters determined that no adjustment is required in the test manufacturing, the initial setting values may be maintained. The operator changes (sets) the control parameters through the setting screen SC1 displayed on the display receiving unit 22 of the article processing device, for example, as shown in FIG. 3. As described above, when the operator operates the setting screen SC1, the input of user information is required. When the operator confirms the control parameters, the operator presses a setting button B1. As a result, the control parameters adjusted by the operator are transmitted to the terminal device 30 as adjusted control parameters, and are centrally managed as the adjusted control parameters (latest reservation data) by the terminal device 30.

When starting the manufacturing of the product, the operator calls the management screen SC2 shown in FIG. 5 on the display receiving unit 33 of the terminal device 30. Then, the operator selects the reservation number (product) set for the target production line (that the operator desires to start the operation) on the management screen SC2. As a result, a list of the latest control parameters (that is, reservation data) of each article processing device corresponding to the selected reservation number is displayed on the management screen SC2. When starting the manufacturing of the product, the operator presses a start button B31. As a result, the latest reservation data is transmitted to the target production line, and each article processing device starts an operation based on the transmitted reservation data.

Figure 6:
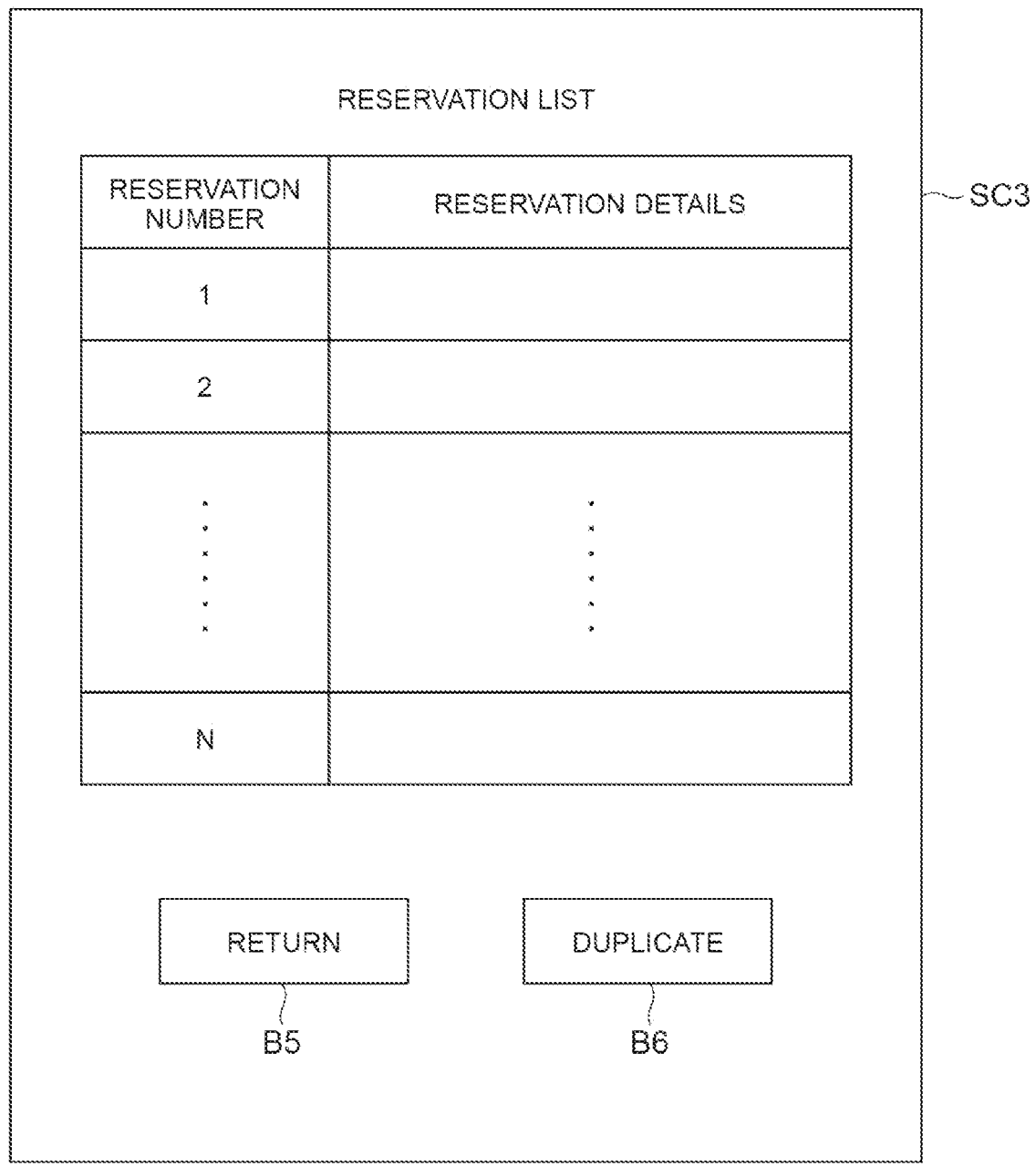
FIG. 6 is an example of a reservation list screen displayed on the display receiving unit of the management device.
Figure 7:
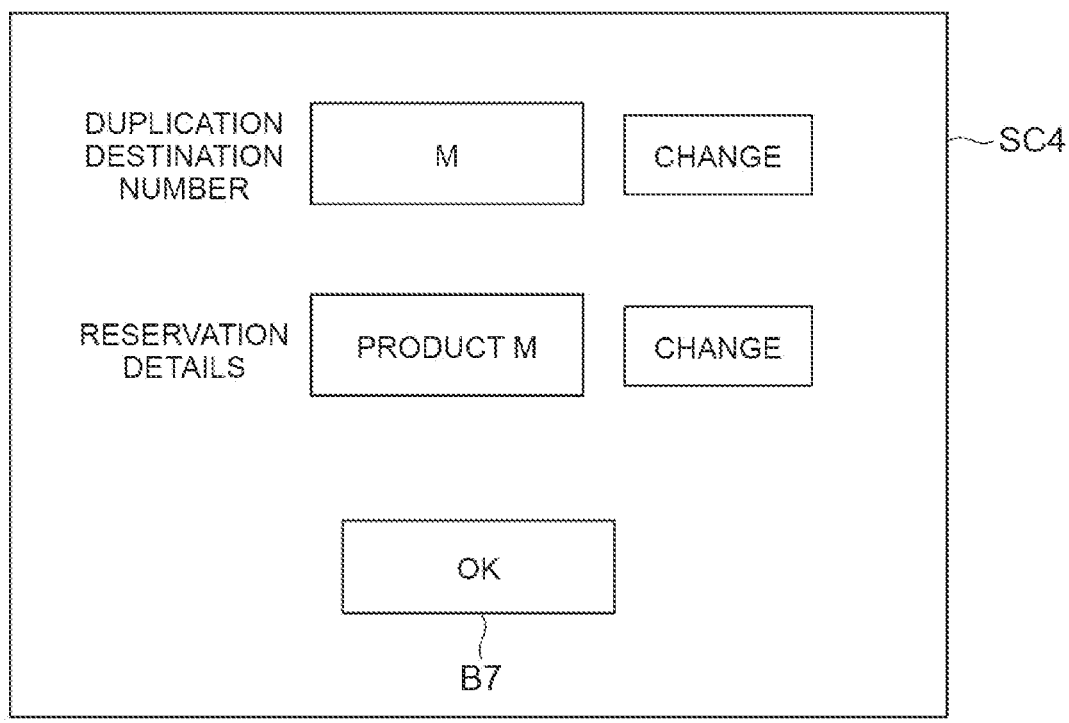
FIG. 7 is an example of a duplicate details screen displayed on the display receiving unit of the management device.

(2) A Case of Duplicating (Copying) Adjusted Control Parameters Set in Another Product or Article Processing Device of Another Production Line The list of adjusted control parameters set in the article processing device of another production line can be displayed by inputting or selecting a reservation number on the management screen SC2 as shown in FIG. 5. The operator presses a reservation list button B4 to display a reservation list screen SC3 shown in FIG. 6. Reservation numbers and reservation details are displayed on the reservation list screen SC3. In addition, line numbers may be displayed on the reservation list screen SC3, or information displayed as the reservation details may include information by which the reservation number can be specified. The operator selects a reservation number for which the adjusted control parameters are desired to be diverted, and presses a duplicate button B6. As a result, the reservation data configured to include the adjusted control parameters set in each of the article processing devices of another production lines is duplicated, and a duplication details screen SC4 shown in FIG. 7 is displayed.

On the duplication details screen SC4, a new reservation number, new reservation details, and a line number as an application target can be set for the duplicated reservation data. The operator changes a temporary reservation number, temporary reservation details, and a temporary line number displayed when the duplicate button B6 is pressed, if necessary, and presses an OK button B7. As a result, new reservation data is set. Then, the operator presses the transmit button B32 on the management screen SC2 to transmit the new reservation data to each of the article processing devices in the target production line 10. That is, the terminal device 30 transmits the new reservation data to the same type of another article processing device having different device identification information. In addition, since the adjustment in the article processing device to which the new reservation data is transmitted and the flow of the reservation data adjusted in the article processing device are the same as those described above, the description thereof will be omitted herein.

In this manner, by using the function of duplicating the adjusted control parameters set in another product or the article processing device of another production line, it is possible to duplicate the settings of the production line B in which the same product as the product to be newly set in the production line A is set and to make new settings of the production line A based on this duplication, or it is possible to duplicate the settings of the production line B in which a product similar to the product to be newly set in the production line A is set and to make new settings of the production line Abased on this duplication, or it is possible to duplicate the settings of the production line A in which a product similar to the product to be newly set in the production line A is set and to make new settings of the production line A based on this duplication.

In addition, when duplicating the settings of a certain production line, a screen for selecting whether to duplicate the same product or another product may be displayed at the first time of duplication. When duplicating the same product, the duplication mode of the same product may be selected, the reservation number of the product may be selected, the line number of the duplication source may be selected, and the line number of the duplication destination may be selected. In addition, the order of these selections can be changed, and these may be selected at the same time. As a result, the control parameters are transmitted to the duplication destination and reset at the duplication destination. When the screen of such a setting procedure is displayed, the operator only has to select the product once without causing duplication mistakes of product differences as compared with the screen of a setting procedure to be described later. This is easy to understand intuitively.

When duplicating another product, the duplication mode of a different product may be selected, the reservation number of the product of the duplication source may be selected, the line number of the duplication source may be selected, the reservation number of the product of the duplication destination may be selected, and the line number of the duplication destination may be selected. In this case as well, the order of these selections can be changed, and these may be selected at the same time. As a result, the control parameters are transmitted to the duplication destination and reset at the duplication destination. When the screen of such a setting procedure is displayed, the adjustment parameters become close to the optimum to some extent by diverting the control parameters of similar products, so that the amount of subsequent adjustment may be small.

In the production line system 1 (terminal device 30) of the embodiment described above, it is possible to set the control parameters in each article processing device by transmitting the control parameters stored in the storage unit 31 to each article processing device by the setting control described above. Therefore, since the operator can make an adjustment in consideration of the machine difference based on the transmitted control parameters, the adjustment burden of the operator can be reduced. In addition, the control parameters adjusted by the operator in each article processing device are collected by the above-described storage control. Therefore, even if the same type of article processing devices are set with different control parameters depending on the production line 10, it is possible to appropriately manage the control parameters changed in each article processing device and to reflect the individually changed control parameters when resetting the control parameters.

In the production line system 1 (terminal device 30) of the embodiment described above, the article processing device determines the user's authority based on the user information received by the display receiving unit 22, and determines whether or not to transmit the adjusted control parameters to the terminal device 30 based on the determined authority. That is, in the terminal device 30 of the embodiment described above, only the adjusted control parameters changed by the authorized operator (administrative user) are stored in the storage unit. Therefore, since only the adjusted control parameters changed by the authorized operator are stored in the storage unit 31, it is possible to prevent the adjusted control parameters from being updated in a disorderly manner.

Although one embodiment has been described above, the present disclosure is not limited to the embodiment described above, and various modifications can be made without departing from the spirit of the present disclosure.

First Modification Example

In the production line system 1 of the embodiment described above, an example in which the control unit 23 of the article processing device performs authentication processing has been described. However, for example, the article processing device may acquire the user information transmitted from the changed article processing device, in which the control parameters have been changed, in addition to the adjusted control parameters and determine what kind of authority the operator of the adjusted control parameters has based on the acquired user information. That is, in the embodiment described above, the authentication processing performed in the article processing device may be performed by the control unit 34 of the terminal device 30. When the control unit 34 of the terminal device 30 determines that the transmitted user information (authentication information) is an administrative user, the control unit 34 stores the acquired adjusted control parameters in the storage unit 31 in association with the device identification information and the reservation number. Also in this configuration, since only the adjusted control parameters changed by the authorized operator are stored in the storage unit 31, it is possible to prevent the adjusted control parameters from being updated in a disorderly manner.

In addition, the authentication processing or the transmission of the user information in the article processing device in the embodiment described above may be omitted, and the terminal device 30 may determine whether or not to store the adjusted control parameters transmitted from the article processing device in the storage unit 31. For example, the control unit 34 of the terminal device 30 may cause the display receiving unit 33 to display a dialog for asking the operator to input whether or not to store the adjusted control parameters transmitted from the article processing device in the storage unit 31. At this time, the control unit 34 may perform processing for authenticating an operator who can input the dialog.

Second Modification Example

In the terminal device 30 of the embodiment or the modification example described above, an example of transmitting the initial setting value stored in advance to the article processing device configuring each production line 10 has been described. However, initial settings for default values may be derived by the following method. Specifically, the storage unit 31 may store information regarding the characteristics of the article and/or the processing of the article in association with the reservation number, and the control unit 34 may generate control parameters as default values based on the information regarding the characteristics of the article and/or the processing of the article when control parameters corresponding to the reservation number are not stored in the storage unit 31. Here, as an example, in the bag-making and packaging devices 12A to 12N, the control parameter is the transport speed of a film for packaging an article, and the information regarding the characteristics of the article and/or the processing of the article for calculating the transport speed (default value before adjustment) of the film as an initial value is the film length of one bag, the production rate, and the like.

In the configuration according to this modification example, it is possible to appropriately set the control parameters by using theoretically reasonable control parameters even though the machine difference is not taken into consideration. This makes the adjustment easier than in the case of adjusting the control parameter from 1 to an appropriate value.

Third Modification Example

In the production line system 1 of the embodiment described above, an example has been described in which the terminal device 30 is configured independently of the article processing device configuring the production line 10. However, for example, a control unit mounted in one article processing device may serve as the terminal device 30. For example, a control unit that is mounted in the bag-making and packaging device 12 configuring one production line and controls various operations of the bag-making and packaging device 12 may have the function of the terminal device 30 described above. In this case, the display unit mounted in the bag-making and packaging device 12 may also have the function of the display receiving unit 33 of the terminal device 30.

In addition, although the device in which the display receiving unit 33 and the control unit 34 are integrally configured has been described as an example of the terminal device 30, the display receiving unit 33 and the control unit 34 may be separately configured so as to be able to communicate with each other. The portion configuring the control unit 34 may be a component (cloud) provided in a data center or the like through a network.

Other Modification Examples

In the above embodiment and modification examples, the terminal device 30 in which the management control unit 34A and the operation control unit 34B are integrally configured has been described as an example. However, the management control unit 34A and the operation control unit 34B may be configured as separate control devices (for example, server devices).

In addition, in the production line system 1 of the embodiment described above, an example has been described in which one terminal device 30 (first receiving unit) capable of operating the article processing devices of a plurality of production lines 10 is provided, but the present disclosure is not limited thereto. For example, one terminal device 30 may be provided for each production line 10. Such a terminal device 30 can have specifications in which only the status of the corresponding production line 10 can be checked (statuses of the other production lines 10 cannot be checked) and only the article processing device of the corresponding production line 10 can be operated (article processing devices of the other production lines 10 cannot be operated). Then, by installing the terminal device 30 in a place where the corresponding production line 10 can be visually recognized, it is possible to prevent an unintended operation and setting change of the production line 10 or it is possible to operate the production line 10 while visually checking the status of the production line 10. In addition, even when the terminal device 30 is provided for each production line 10, the terminal device 30 may have specifications in which the statuses of the other production lines 10 can be checked and the article processing devices of the other production line 10 can be operated.

As described above, even when a plurality of terminal devices 30 are provided, the terminal device 30 can acquire not only the status and setting information of the corresponding production line 10 but also the status and setting information of the other production lines 10 through the storage unit 31 provided integrally with or separately from the terminal device 30. In addition, as for the storage unit 31, not only one storage unit 31 that centrally manages the information of a plurality of production lines 10 may be provided, but also, for example, a plurality of storage units 31 may be respectively provided for the plurality of production lines 10. In this case, the plurality of storage units 31 may be synchronized with each other at predetermined intervals. Even if the plurality of storage units 31 are not synchronized, the control unit 34 may access the desired storage unit 31 (storage unit 31 that manages the production line including an article processing device whose control parameters need to be acquired) to acquire desired information if necessary.

In the above embodiment and modification examples, the screen configuration of the setting screen SC1, the management screen SC2, the reservation list screen SC3, and the duplication details screen SC4 is an example, and the screen configuration is not limited thereto as long as information for realizing the above-described functions can be displayed and input.

The terminal device 30 may emulate the operation unit (control unit of the operation panel) of each article processing device to access the control unit of each article processing device. By the emulation of the terminal device 30, various control parameters set in the control unit of each article processing device can be extracted from the terminal device 30. Therefore, even if each article processing device does not have an external output function by communication, the terminal device 30 can acquire the necessary control parameters. In addition, by the emulation of the terminal device 30, the control parameters of each article processing device can be set from the terminal device 30. Therefore, even if each article processing device does not have an external import function by communication, each article processing device can be operated by the control parameters stored in the storage unit 31 of the terminal device 30.

The various embodiments and modification examples described above may be combined in various ways without departing from the spirit of the present disclosure.

What is claimed is:

1. A management device configured to manage a same type of article processing devices provided in each of different production lines, comprising:
   a storage unit configured to store associated device identification information for uniquely identifying each of the article processing devices, a reservation number for uniquely identifying different types of products, a control parameter regarding operation of each of the article processing devices, and adjustment information regarding a change when the control parameter is changed in accordance with each of the article processing devices;
   a first receiving unit configured to receive an input of the reservation number;
   a communication unit configured to communicate with each of the article processing devices; and
   a management control unit configured to acquire the control parameter and the device identification information corresponding to the reservation number from the storage unit, when the first receiving unit receives the reservation number,
   wherein the management control unit is further configured to perform setting control for transmitting, via the communication unit, the acquired control parameter to each of the article processing devices identified based on the device identification information and to perform storage control for storing the adjustment information of the changed control parameter in the storage unit in association with the device identification information and the reservation number when the control parameter transmitted to each of the article processing devices is changed in accordance with each of the article processing devices, to compensate a machine difference in each of the article processing devices of the same type.

2. The management device according to claim 1, wherein the storage control determines whether or not to store the adjustment information of the changed control parameter in the storage unit in association with the device identification information and the reservation number based on the adjustment information of the changed control parameter as well as authentication information transmitted from each of the article processing devices where the control parameter is changed.

3. The management device according to claim 1, wherein the storage control causes the first receiving unit to receive a selection of whether or not to store the adjustment information of the changed control parameter in the storage unit in association with the device identification information and the reservation number.

4. The management device according to claim 1, wherein the storage control determines whether or not to store the adjustment information of the changed control parameter in the storage unit in association with the device identification information and the reservation number based on whether or not the adjustment information of the changed control parameter meets predetermined conditions.

5. The management device according to claim 1, wherein the storage control determines whether or not the adjustment information of the changed control parameter meets predetermined conditions and stores the adjustment information of the changed control parameter that meets the predetermined conditions or the adjustment information of the changed control parameter that does not meet the predetermined conditions in the storage unit so as to be identifiable.

6. The management device according to claim 1, wherein the setting control transmits the adjustment information to another of the same type of article processing devices in which the device identification information differs.

7. The management device according to claim 1, wherein the setting control transmits the control parameter to another of the same type of article processing devices in which the device identification information differs.

8. The management device according to claim 1, wherein the storage unit stores processing information regarding at least one of characteristics of the product or articles forming the product and processing of the product or the articles in association with the reservation number, and
the control unit generates the control parameter as a default value based on the processing information when the control parameter corresponding to the reservation number is not stored in the storage unit.

9. The management device according to claim 1, further comprising:
an operation control unit configured to read at least one of the control parameter and the adjustment information corresponding to the reservation number from the storage unit, when the first receiving unit receives the reservation number, to transmit the at least one of the control parameter and the adjustment information to each of the article processing devices based on the device identification information, and to operate each of the article processing devices based on the at least one of the control parameter and the adjustment information.

10. An article management system, comprising:
the management device according to claim 1;
the article processing devices provided so as to be communicable with the management device via the communication unit; and
a control device having a second receiving unit configured to receive the reservation number and an operation control unit configured to read at least one of the control parameter and the adjustment information corresponding to the reservation number from the storage unit, when the second receiving unit receives the reservation number, to transmit the at least one of the control parameter and the adjustment information to each of the article processing devices based on the device identification information, and to operate each of the article processing devices based on the at least one of the control parameter and the adjustment information.

11. An article management system, comprising:
the management device according to claim 1; and
the article processing devices provided so as to be communicable with the management device via the communication unit.

12. The article management system according to claim 11, wherein each of the article processing devices has a third receiving unit configured to receive authentication information and is configured to determine whether or not to transmit the adjustment information of the changed control parameter to the management device based on the authentication information received by the third receiving unit.

13. The management device according to claim 1, wherein the article processing devices are combination weighing devices, and
the control parameter includes at least one of a target mass value, a mass upper limit value, a feeder strength, a feeder time, and a capacity of each of the combination weighing devices.

14. The management device according to claim 1, wherein the article processing devices are bag-making and packaging devices, and
the control parameter includes at least one of a bag width, a register mark position, a tracking position, and a capacity of each of the bag-making and the packaging devices.

15. The management device according to claim 1, wherein the article processing devices are seal inspection devices, and
the control parameter includes at least one of a length of a sealed bag, a minimum thickness of the sealed bag, a maximum thickness of the sealed bag, an air leakage determination value of the sealed bag, and a pressure level of the sealed bag.

16. The management device according to claim 1, wherein the article processing devices are weight inspection devices, and
the control parameter includes at least one of a bag length, a reference mass value, a mass lower limit value, a mass upper limit value, and an empty bag mass.

17. The management device according to claim 1, wherein the article processing devices are boxing devices, and
the control parameter includes at least one of a box length, a box width, a box height, a number of rows of boxes, and a number of bags in each row.

* * * * *